United States Patent
Izutani et al.

(10) Patent No.: US 10,202,511 B2
(45) Date of Patent: Feb. 12, 2019

(54) HYDROPHILIC COATING FILM, METHOD FOR PRODUCING SAME, HUMIDIFICATION ELEMENT, AND HUMIDIFICATION DEVICE

(71) Applicant: MITSUBISHI ELECTRIC CORPORATION, Chiyoda-ku (JP)

(72) Inventors: Tasuku Izutani, Chiyoda-ku (JP);
Yoshinori Yamamoto, Chiyoda-ku (JP);
Yasuhiro Yoshida, Chiyoda-ku (JP);
Osamu Hiroi, Chiyoda-ku (JP);
Masaru Takada, Chiyoda-ku (JP);
Hiroshi Tsutsumi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 125 days.

(21) Appl. No.: 15/030,544

(22) PCT Filed: Jun. 5, 2014

(86) PCT No.: PCT/JP2014/065015
§ 371 (c)(1),
(2) Date: Apr. 19, 2016

(87) PCT Pub. No.: WO2015/093078
PCT Pub. Date: Jun. 25, 2015

(65) Prior Publication Data
US 2016/0251521 A1 Sep. 1, 2016

(30) Foreign Application Priority Data
Dec. 18, 2013 (JP) .................. 2013-260754

(51) Int. Cl.
*C09D 5/00* (2006.01)
*C09D 1/00* (2006.01)
(Continued)

(52) U.S. Cl.
CPC .............. *C09D 5/00* (2013.01); *C09D 1/00* (2013.01); *C09D 7/43* (2018.01); *F24F 6/04* (2013.01); *C09D 133/06* (2013.01)

(58) Field of Classification Search
CPC ... C09D 1/00; C09D 5/00; C09D 7/43; C09D 133/06; F24F 6/04
(Continued)

(56) References Cited

U.S. PATENT DOCUMENTS 6,474,628 B1 * 11/2002 Stroh .................. F24F 6/04
261/107
9,816,715 B2 * 11/2017 Morikawa ............. F24F 6/02

FOREIGN PATENT DOCUMENTS

| CN | 1394674 A | 2/2003 |
| CN | 102653639 A | 9/2012 |

(Continued)

OTHER PUBLICATIONS

Combined Chinese Office Action and Search Report dated Mar. 14, 2017 in Patent Application No. 201480068939.X (with English Translation and English Translation of Category of Cited Documents).

(Continued)

*Primary Examiner* — Charles S Bushey
(74) *Attorney, Agent, or Firm* — Oblon, McClelland, Maier & Neustadt, L.L.P.

(57) ABSTRACT

To provide a hydrophilic coating film that excels not only in initial humidification performance, but also in long-term humidification performance as well as to provide a production method for the hydrophilic coating film, and a humidification element. A hydrophilic coating film (7) contains porous silica gel particles (3), fine inorganic particles (2) having an average particle diameter smaller than an average pore diameter of the silica gel particles (3), and a thickener
(Continued)

(8). A production method for the hydrophilic coating film (7) coats a base material (1) with a coating composition and dries the coated base material (1), the coating composition containing water (6), a thickener (6), porous silica gel particles (3), and fine inorganic particles (2) having an average particle diameter smaller than an average pore diameter of the silica gel particles (3).

14 Claims, 5 Drawing Sheets

(51) Int. Cl.
*F24F 6/04* (2006.01)
*C09D 7/43* (2018.01)
*C09D 133/06* (2006.01)

(58) Field of Classification Search
USPC .................................................. 261/100, 101
See application file for complete search history.

(56) References Cited

FOREIGN PATENT DOCUMENTS

| | | |
|---|---|---|
| JP | 4-224874 A | 8/1992 |
| JP | 6-74500 A | 3/1994 |
| JP | 2001-62384 A | 3/2001 |
| JP | 2002-161240 A | 6/2002 |
| JP | 2005-298237 A | 10/2005 |
| JP | 2006-206914 A | 8/2006 |
| JP | 2011-31541 A | 2/2011 |
| JP | 2011-111644 A | 6/2011 |

OTHER PUBLICATIONS

International Search Report dated Sep. 9, 2014, in PCT/JP2014/065015 filed Jun. 5, 2014.
Green Earth Nano Science Inc., "Mechanism of Photocatalysis", retrieved on Aug. 5, 2018 from www.mchnanosolutions.com/mechanism.html.
M. T. Nichols, et al., "Measurement of bandgap energies in low-k organosilicates", Journal of Applied Physics 115, 094105 (2014).

\* cited by examiner

HYDROPHILIC COATING FILM, METHOD FOR PRODUCING SAME, HUMIDIFICATION ELEMENT, AND HUMIDIFICATION DEVICE

TECHNICAL FIELD

The present invention relates to a hydrophilic coating film used for a humidification device, a production method for the coating film, a humidification element, and a humidification device.

BACKGROUND ART

A humidification element using a water absorptive sheet material is generally used for a humidification device. With the humidification device, water is supplied to the humidification element, and air is humidified using evaporation of the water. Thus, the humidification element needs to excel not only in performance, but also in water resistance from a viewpoint of preventing deterioration with water because of long-term exposure to water. Also, it is required that the humidification performance of the humidification element does not deteriorate due to VOC contamination because volatile organic compounds (VOCs) may exist in indoor environment immediately after new construction and reconstruction of a house or building. As water absorptive sheet materials for the humidification element, a base material on which a hydrophilic coating film is formed, a base material subjected to hydrophilic treatment, and other similar materials are used commonly.

The hydrophilic coating film can be formed using any of various materials and methods. For example, it is generally known that a hydrophilic coating film made of silica excels in hydrophilic properties. On the other hand, silica is prone to adsorb contaminants such as volatile organic compounds (VOCs). Consequently, when a base material on which a hydrophilic coating film of silica has been formed is used for a humidification element, there is a problem in that although good humidification performance is available at an initial stage, contaminants and similar substances are adsorbed over time, resulting in reduced hydrophilic properties and thereby failing to provide sufficient humidification performance.

As a method for solving this problem, it is conceivable to increase a specific surface area by making the hydrophilic coating film of silica porous and thereby expose large quantities of hydroxyl groups existing in a surface of the hydrophilic coating film. Consequently, even if contaminants and similar substances are adsorbed in the hydrophilic coating film, since large quantities of hydroxyl groups are exposed, it is considered that hydrophilic properties can be maintained for a long period of time.

As a method for making the hydrophilic coating film of silica porous, for example, a method has been proposed that gives hydrophilic properties to a surface of foam metal by forming a hydrophilic silica film (sol-gel silica) obtained by sol-gel method on the surface of the foam metal (see Patent Literature 1). Here, the sol-gel method is a method of synthesizing silica and the like by putting tetraethyl orthosilicate, which is a silica precursor, into a gel state by heating and the like and causing the tetraethyl orthosilicate to undergo hydrolysis and polycondensation reaction under acidic or basic conditions to desorb alcohol. Also, as another method, a method has been proposed that scatters porous silica gel particles in a hydrophilic silica film (sol-gel silica) obtained by sol-gel method and thereby improves the specific surface area of the film (see Patent Literature 2).

Furthermore, as another method, a method has been proposed that scatters porous silica gel particles in a binder made of resin and thereby improves the specific surface area of a film (see Patent Literature 3).

CITATION LIST

Patent Literature

Patent Literature 1: Japanese Unexamined Patent Application Publication No. 2011-31541
Patent Literature 2: Japanese Unexamined Patent Application Publication No. 2011-111644
Patent Literature 3: Japanese Unexamined Patent Application Publication No. 6-74500

SUMMARY OF INVENTION

Technical Problem

However, with the conventional method of giving hydrophilic properties to the surface of foam metal, the hydrophilic coating film becomes a smooth film with reduced irregularities, failing to give a sufficient specific surface area to the film. Consequently, there is a problem in that contaminants and similar substances are prone to get adsorbed over time, resulting in reduced hydrophilic properties and thereby failing to provide humidification performance for a long period of time.

Also, with the conventional method of scattering porous silica gel particles in a sal-gel silica, there is a problem in that the sol-gel silica permeates pores of the silica gel particles, failing to achieve an effect of improving the specific surface area sufficiently and thereby failing to provide humidification performance for a long period of time.

Also, with the method of scattering porous silica gel particles in a binder resin, as with sol-gel silica, the binder resin permeates into the silica gel particles, making it impossible to achieve an effect of improving the specific surface area sufficiently and thereby failing to provide humidification performance for a long period of time.

The present invention has been made to solve the above problems and has an object to provide a hydrophilic coating film that excels not only in initial humidification performance, but also in long-term humidification performance as well as to provide a production method for the hydrophilic coating film, a humidification element, and a humidification device.

Solution to Problem

The present inventors have conducted earnest studies to solve the above problems and found that a hydrophilic coating film with a large specific surface area can be formed by coating a base material with a coating composition containing water with a thickener dissolved therein, porous silica gel particles, and hydrophilic inorganic fine particles having an average particle diameter smaller than an average pore diameter of the silica gel particles and drying the coated base material, and that the hydrophilic coating film thus obtained is suitable for a humidification element. That is, the hydrophilic coating film according to the present invention contains porous silica gel particles, hydrophilic inorganic fine particles having an average particle diameter smaller than the average pore diameter of the silica gel particles, and a thickener. The "specific surface area" as referred to herein means a value measured by a gas absorption method (BET method).

Advantageous Effects of Invention

The present invention provides a hydrophilic coating film that excels not only in initial humidification performance, but also in long-term humidification performance as well as provides a humidifier using the same and a production method for the hydrophilic coating film and a humidification element.

DESCRIPTION OF EMBODIMENTS

Embodiment 1

Figure 1:
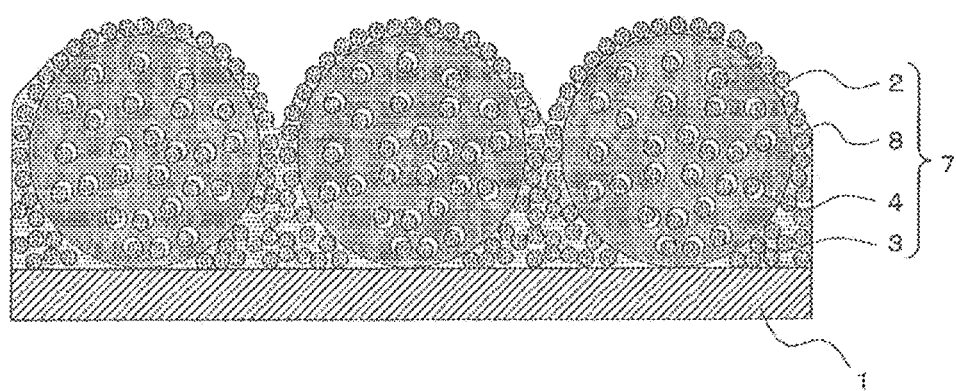
FIG. 1 is a sectional view of a hydrophilic coating film according to Embodiment 1.

FIG. 1 shows a sectional view of a hydrophilic coating film according to Embodiment 1 for implementing the present invention. The hydrophilic coating film 7 according to the present embodiment contains porous silica gel particles 3, hydrophilic fine inorganic particles 2 having an average particle diameter smaller than an average diameter of pores 4 in the silica gel particles 3, and a thickener 8.

Figure 2:
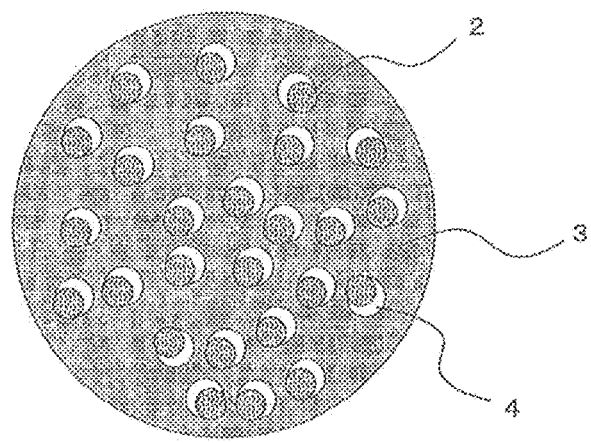
FIG. 2 is a sectional view of one silica gel particle in the hydrophilic coating film according to Embodiment 1.

FIG. 2 is a sectional view of one silica gel particle in the hydrophilic coating film according to the present embodiment. The silica gel particle 3 has porosity and has plural pores 4. Each of the pores 4 contains hydrophilic fine inorganic particles 2 having an average particle diameter smaller than the average diameter of the pores 4.

Figure 3:
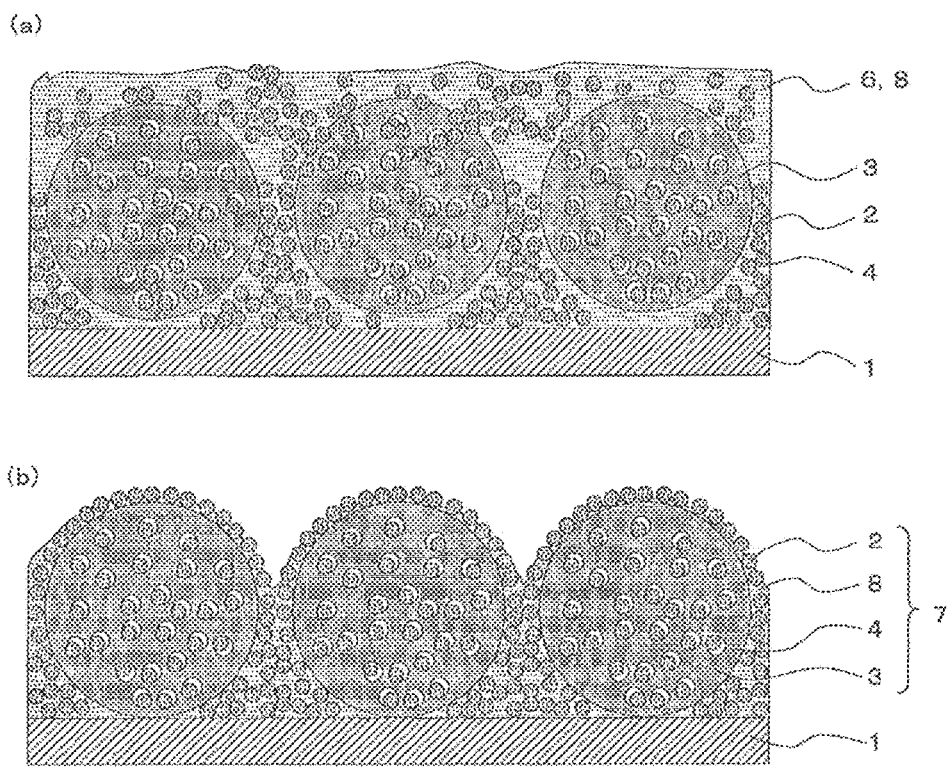
FIGS. 3(a) and 3(b) are diagrams for describing a production method for the hydrophilic coating film according to Embodiment 1.

FIG. 3 is a diagram for describing a production method for the hydrophilic coating film according to the present embodiment. In a first step of the production method for the hydrophilic coating film according to the present embodiment, a base material 1 is coated with a coating composition containing water 6 with the thickener 8 dissolved therein, the porous silica gel particles 3, the hydrophilic fine inorganic particles 2 having an average particle diameter smaller than the average diameter of the pores 4 in the silica gel particles 3 (see FIG. 3(a)). Then, the coated object is dried in a second step (see FIG. 3(b)).

Examples of the silica gel particles 3 used in the coating composition of the present invention include "LIGHTSTAR LA-S283A" (trade name) produced by Nissan Chemical Industries, Ltd., "LIGHTSTAR LA-S203C" (trade name) produced by Nissan Chemical Industries, Ltd., "LIGHTSTAR LA-S263" (trade name) produced by Nissan Chemical Industries, Ltd., "LIGHTSTAR LA-S143AK" (trade name) produced by Nissan Chemical Industries, Ltd., "LIGHTSTAR LA-S23A" (trade name) produced by Nissan Chemical Industries, Ltd., "LIGHTSTAR LA-S20C" (trade name) produced by Nissan Chemical Industries, Ltd., "LIGHTSTAR LA-S26" (trade name) produced by Nissan Chemical Industries, Ltd., and "LIGHTSTAR LA-S14K" (trade name) produced by Nissan Chemical Industries.

Preferably, the average particle diameter of silica gel particles 3 is between 200 nm and 5 µm. This is because this range provides a more sufficient specific surface area while effectively securing desired film thickness and film irregularities. Also, adhesion of the coating film is increased in this range, making it possible to further inhibit separating off of silica gel particles 3.

Figure 4:
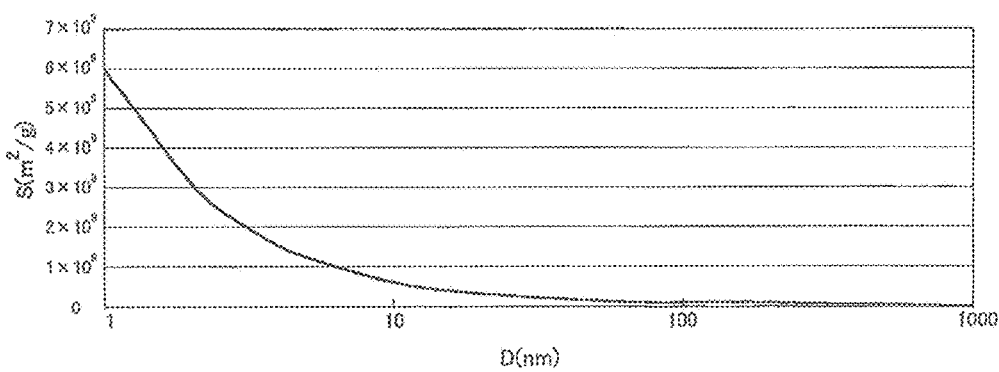
FIG. 4 is a diagram showing a relationship between average pore diameter (D) of silica gel particles and specific surface area (S) of the silica gel particles.

As described above, the silica gel particles 3 used in the present embodiment have the pores 4 therein and have a large specific surface area. In FIG. 4, the abscissa represents the average diameter (D) (unit: nm) of the pores 4 in the silica gel particles 3 and the ordinate represents the specific surface area (S) of the silica gel particles 3 (unit: m²/g). The graph in FIG. 4 represents the specific surface area (S) of the silica gel particles 3 determined using the following calculation formula when the average diameter (D) of the pores 4 in the silica gel particles 3 is varied.

$S = 6 \div \{\text{density of silica gel particles } 3 (g/cm^3) \times D\}$

The specific surface area (S) of the silica gel particles 3 is inversely proportional to length (D) of the diameter of the pores 4 in silica gel particles 3, and size (S) of the specific surface area increases with decreases in the length (D) of the average diameter of the pores 4 in the silica gel particles 3. Preferably, the average pore diameter of the silica gel particles 3 used in the present embodiment is between greater than 4 nm and equal to or less than 100 nm. This is because in this range, hydrophilic inorganic fine particles 2 with an average particle diameter of 4 nm or above can be used, making the hydrophilic inorganic fine particles less prone to cohesion and thereby making it possible to form a hydrophilic coating film with a larger specific surface area. Also, the hydrophilic inorganic fine particles 2 used in the present embodiment may satisfy the range of the average pore diameter not only when a peak of a distribution of pore diameters is unimodal but also when the peak of the distribution of pore diameters is multimodal.

The hydrophilic inorganic fine particles 2 used for the coating film are not particularly limited, and examples thereof include silica particulates, titania particulates, and alumina particulates. These substances can be used singly or two or more types can be used in combination. Of these particulates, the silica particulates, which have hydroxyl groups on surfaces and have high hydrophilic properties, is preferable. With the silica particulates, which dissolve slightly in water, even if contaminants are adsorbed on the surfaces of silica particulates a surface layer elutes slowly by contact with water, allowing a new surface free of adsorbed contaminants to be exposed. Therefore, use of silica particulates allows hydrophilic properties to be maintained for a long period of time.

The average particle diameter of the hydrophilic inorganic fine particles 2 is not particularly limited as long as the average particle diameter is smaller than the average diameter of the pores 4 in the silica gel particles 3, but is preferably 15 nm or less, and more preferably between equal to or greater than 4 nm and equal to or less than 15 nm. Use of the hydrophilic inorganic fine particles 2 whose average particle diameter falls within this range makes it possible to increase specific surface area of the hydrophilic coating film made of a coating composition.

In particular, because a surface portion corresponding to approximately 15 to 30 mass % per hydrophilic inorganic fine particle becomes dissolved in the coating composition, the hydrophilic inorganic fine particles 2 whose average particle diameter falls within the above-mentioned range serves as a binder in drying the coating composition, making it possible to further increase strength of the hydrophilic coating film 7. Furthermore, since the hydrophilic inorganic fine particles become less prone to cohesion, the hydrophilic coating film 7 can have a larger specific surface area.

Figure 5:
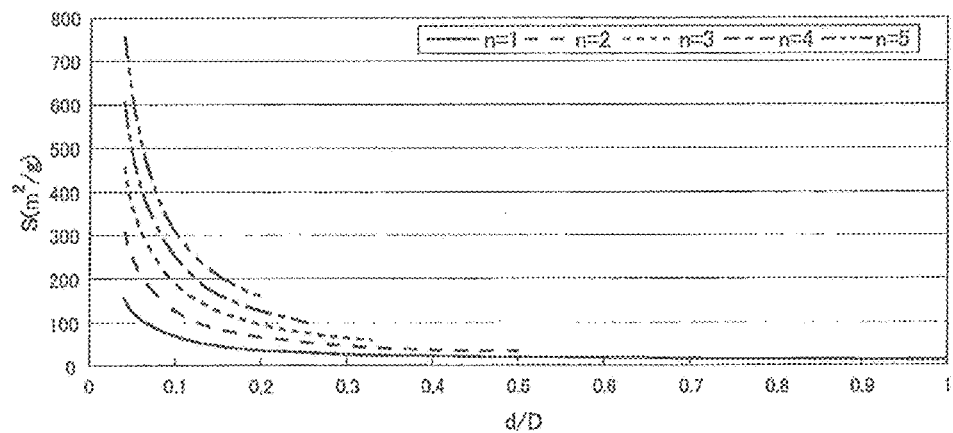
FIG. 5 is a diagram showing a relationship of specific surface area (S) of the coating film with a ratio between the average pore diameter (D) of silica gel particles and average particle diameter (d) of hydrophilic inorganic fine particles when the ratio is varied.

In FIG. 5, the abscissa represents a ratio between the average diameter (D) of the pores 4 in the silica gel particles 3 and the average particle diameter (d) of the hydrophilic inorganic fine particles 2 in the hydrophilic coating film 7 while the ordinate represents the specific surface area (S) (unit: $m^2/g$) of the coating film. The graphs in FIG. 5 represent a relationship of the specific surface area (S) of the coating film with the ratio between the average diameter (D) of the pores 4 in the silica gel particles 3 and the average particle diameter (d) of the hydrophilic inorganic fine particles 2 in the hydrophilic coating film 7 when the ratio is varied. Also, graphs shown in FIG. 5 show the specific surface area (S) by varying the number of hydrophilic inorganic fine particles 2 filled into the pores 4 of the silica gel particles 3 in a sectional direction when the average diameter (D) of the pores 4 of silica gel particles 3 becomes equal to or larger than an integral multiple of the average particle diameter (d) of the hydrophilic inorganic fine particles 2. The number of hydrophilic inorganic fine particles 2 filled into the pores 4 of the silica gel particles 3 in the sectional direction increases with decreases in the average particle diameter (d) of the hydrophilic inorganic fine particles 2, further increasing the specific surface area (S).

Content of the hydrophilic inorganic fine particles 2 is not particularly limited, but is preferably between equal to or greater than 0.2 mass % and less than 10 mass %, more preferably between equal to or greater than 0.5 mass % and equal to or less than 8 mass %, and most preferably between equal to or greater than 1 mass % and equal to or less than 5 mass %. In this range, thickness of the formed hydrophilic coating film 7 can be increased further and the hydrophilic properties of the hydrophilic coating film 7 can be secured further. Also, by elution in water of the film, the hydrophilic properties can be maintained for a longer period of time without the hydrophilic coating film 7 being lost. Furthermore, because defects such as cracks do not develop on the formed hydrophilic coating film 7, the hydrophilic coating film 7 becomes still less prone to come off the base material 1.

Use forms of the hydrophilic inorganic fine particles 2 are not particularly limited, but it is preferable to use colloidal hydrophilic inorganic fine particles 2 from a viewpoint of handleability. The colloidal hydrophilic inorganic fine particles 2 have not only high hydrophilic surface properties, but also solubility in water although in trace degrees. Thanks to the solubility, even when an outermost surface is contaminated, the surface layer elutes slowly by absorbing water and allows a surface free of contamination to be exposed, making it possible to maintain hydrophilic properties. Examples of such colloidal hydrophilic fine inorganic particles 2 available for use include "SNOWTEX S" (trade name) produced by Nissan Chemical Industries, Ltd., "SNOWTEX OS" (trade name) produced by Nissan Chemical Industries, Ltd., "SNOWTEX UP" (trade name) produced by Nissan Chemical Industries, Ltd., "SNOWTEX O" (trade name) produced by Nissan Chemical Industries, Ltd., "SNOWTEX OUP" (trade name) produced by Nissan Chemical Industries, Ltd., "Cataloid SI-50" (trade name) produced by JGC Catalysts and Chemicals Ltd., and "Cataloid SI-550" (trade name) produced by JGC Catalysts and Chemicals Ltd.

Also, the hydrophilic inorganic fine particles 2 used in the present embodiment may be not only globular hydrophilic inorganic fine particles, but also chain hydrophilic fine inorganic particles made up of globular hydrophilic inorganic fine particles chained together. When chain hydrophilic fine inorganic particles are used, only ends of the chain hydrophilic fine inorganic particles enter the pores 4 of the silica gel particles 3 and a film having a high specific surface area can be obtained almost without changing pore diameter in the silica gel particles 3.

From a viewpoint of increasing the surface area of the hydrophilic coating film 7 to be formed, the hydrophilic coating film 7 can further contain hydrophilic inorganic particles having an average particle diameter larger than the average pore diameter of silica gel particles. Specifically, the hydrophilic coating film 7 can further contain hydrophilic inorganic particles with an average particle diameter of greater than 15 nm to equal to or less than 100 nm. When particles differing in particle diameter are combined, an irregular surface structure can be formed more easily on the hydrophilic coating film 7 than when only the hydrophilic inorganic fine particles 2 are used, and the hydrophilic coating film 7 formed can have a larger specific surface area.

The water 6 used in the coating composition is not particularly limited, and examples thereof include RO water (low-impurity water after passing through a reverse osmosis membrane, where RO stands for reverse osmosis), deionized water, and pure water such as distilled water. Content of water 6 in the coating composition is not particularly limited, but is preferably between equal to or greater than 80 mass % and equal to or less than 99.8 mass %, more preferably between equal to or greater than 85 mass % and equal to or less than 99 mass %, and most preferably between equal to or greater than 90 mass % and equal to or less than 98 mass %. In this range, the coating composition is easy to apply more uniformly to the base material 1, making it easy to form a hydrophilic coating film 7 having desired characteristics.

Also, preferably content of silica gel particles 3 is between equal to or greater than 1 mass % and equal to or less than 10 mass % of the hydrophilic inorganic fine particles 2. This is because in this range, addition of silica gel particles 3 causes the specific surface area to increase markedly. Also, because then the hydrophilic inorganic fine particles 2 can coat the surface of the silica gel particles 3 more effectively, and the silica gel particles 3 become still less prone to separating off from the surface of the coating film 7.

The coating composition contains a water-soluble thickener 8 from a viewpoint of improving ease of application to the base material 1. Admixture of the water-soluble thickener 8 makes it possible to increase viscosity of the coating composition, decrease fluidity of the fine particles in the coating composition, and improve the ease of application and adhesion to the base material 1.

The thickener 8 is not particularly limited, and examples thereof include a water-soluble resin such as polyacrylic acid, sodium polyacrylate, and hydroxyethyl cellulose, which can be used appropriately according to pH of the coating composition. Examples of such thickeners 8 available for use include, "RHEOGIC 262L" (trade name of sodium polyacrylate) produced by TOAGOSEI CO., LTD., "HEC Daisel SP600" (trade name of hydroxyethyl cellulose) produced by Daisel Corporation, and "JUNLON PW111" (trade name of polyacrylic acid) produced by TOAGOSEI CO., LTD.

Preferably content of the thickener 8 is between equal to or greater than 0.05 mass % and equal to or less than 0.25 mass %. This range provides a more sufficient viscosity enhancement effect, further prevents the silica gel particles 3 from settling in the coating composition, and a particle component from flowing out during application and drying of the coating composition, and more sufficiently secure the hydrophilic properties of the coating film. Also, an appropriate amount of a resin component is contained in the coating film 7, securing a specific surface area and further preventing the coating film 7 from coming off the base material 1 under influence of water absorption and the like.

The base material 1 is not particularly limited, and examples thereof include resin foam, a sintered porous body, foam metal, and nonwoven fabric. These materials can be used singly, or two or more types can be used in combination.

The resin foam is not particularly limited, and examples thereof include thermoplastic resin foam of polyurethane, polystyrene, and polyolefin foamed by a foaming agent. To improve hydrophilic properties of resin foam surfaces, a hydrophilic functional group such as a carboxylic acid or hydroxy group may be introduced into the resin foam. As foam metal, a porous metal body of titanium, copper, tin, silver, or other metal foamed by a foaming agent can be used. The material of sintered porous body is not particularly limited, and examples thereof include a sintered organic material (sintered plastic) formed by sintering thermoplastic resin foam of polyethylene, polymethyl methacrylate, polystyrene, or another resin; a sintered metal material; a sintered inorganic body; and a similar other sintered material. Also, the sintered porous body may be hydrophilized by a method known in the present technical field to improve the hydrophilic properties of the surface. The nonwoven fabric is not particularly limited, and examples thereof include a nonwoven fabric formed of resin such as polyester, polypropylene, polyethylene, or cellulose. Also, to improve hydrophilic properties of nonwoven fabric surfaces, a hydrophilic functional group such as a carboxylic acid or hydroxy group may be introduced into the resin.

The base material 1 may be a porous one. In that case, an average hole diameter of the base material 1 is not particularly limited, but is preferably between equal to or greater than 50 nm and equal to or less than 600 μm, and more preferably between equal to or greater than 50 μm and equal to or less than 200 μm. This range allows desired humidification performance and water absorption performance to be secured further.

A method for applying the coating composition to the base material 1 is not particularly limited, and examples thereof include spray coating, brush coating, application with various coaters, and dip coating. An application amount of the coating composition is not particularly limited, and may be adjusted appropriately according to size of the humidification element to be produced. Also, the coating composition may be divided and applied multiple times in desired amounts.

Also, from a viewpoint of improving wettability of a surface of the base material 1, the base material 1 may be subjected to surface treatment such as ozone oxidation or ultraviolet irradiation before application of the coating composition to the base material 1.

A method for drying the coated object is not particularly limited, and a method known in the present technical field may be used. For example, the coated object can be left to dry under natural conditions, thereby vaporizing water 6.

The specific surface area of hydrophilic coating film 7 formed by this method is between equal to or greater than 200 $m^2/g$ and equal to or less than 600 $m^2/g$, and more preferably between equal to or greater than 250 $m^2/g$ and equal for or less than 500 $m^2/g$. This range allows hydrophilic properties to be maintained for a long period of time while further securing the strength of the hydrophilic coating film 7.

Figure 6:
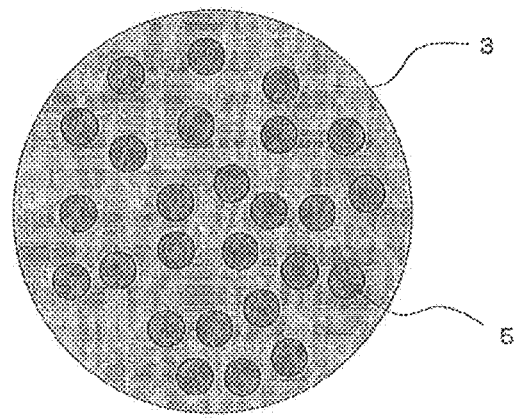
FIG. 6 is a sectional view of one silica gel particle in a hydrophilic coating film of typical sol-gel silica.

FIG. 6 is a sectional view of a silica gel particle in a hydrophilic coating film of typical sol-gel silica. In FIG. 6, the sol-gel silica 5l permeates the pores 4 of the silica gel particle 3, making it impossible to achieve an effect of improving the specific surface area sufficiently and thereby failing to provide sufficient humidification performance. On the other hand, being configured such that the pores 4 in the silica gel particles 3 contain hydrophilic fine inorganic particles 2 having an average particle diameter smaller than the average diameter of the pores 4, the hydrophilic coating film 7 according to the present invention can have a large specific surface area.

Embodiment 2

Next, an example in which a hydrophilic coating film according to Embodiment 1 is applied to a humidification element will be described as Embodiment 2 of the present invention.

Figure 7:
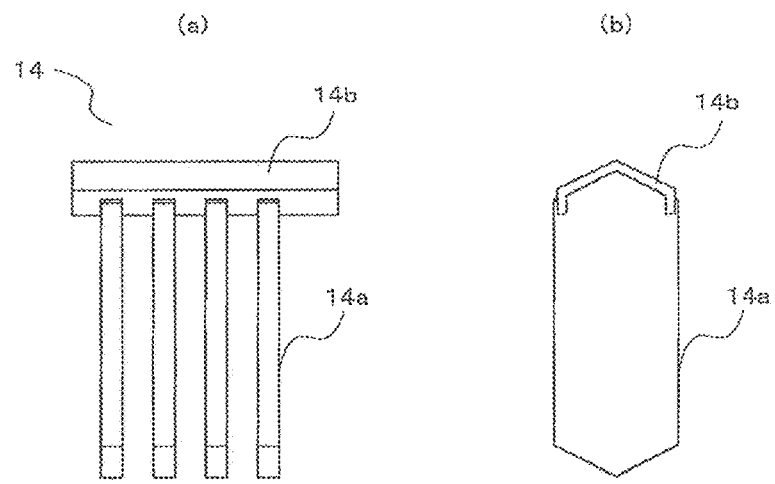
FIGS. 7(a) and 7(b) are block diagrams of a humidification element according to Embodiment 2.
Figure 8:
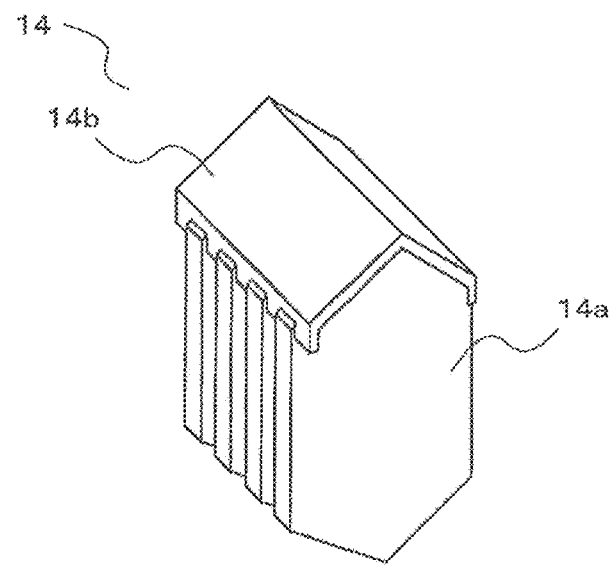
FIG. 8 is a perspective view of the humidification element according to Embodiment 2.

FIGS. 7(*a*) and 7(*b*) are block diagrams of a humidification element 14 according to Embodiment 2, where (a) is a side view and (b) is a front view. FIG. 8 is a perspective view of the humidification element 14.

The humidification element 14 is made up of plural sheet members 14*a* and pectinate member 14*b*. The plural sheet members 14*a* are fitted in the pectinate member 14*b* and held by being spaced away at predetermined intervals. The sheet member 14*a* is configured by using the above-mentioned nonwoven resin fabric or foam metal as material (base material) and forming the hydrophilic coating film 7 on a surface of the material.

Figure 9:
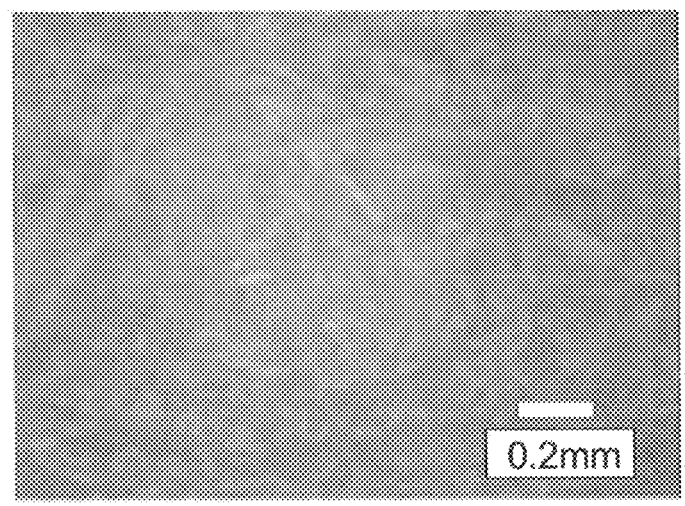
FIG. 9 is an enlarged view of a surface of a humidification element (base material) made of a nonwoven resin fabric.

FIG. 9 is an enlarged view of a surface of the sheet member (base material) on which the hydrophilic coating film 7 is formed, the sheet member being made of a nonwoven resin fabric. The nonwoven fabric can hold water with gaps being formed by fibers overlapping one another. Note that the length of the blank space above the numeric value 0.2 mm in FIG. 9 corresponds to a length of "0.2 mm."

Figure 10:
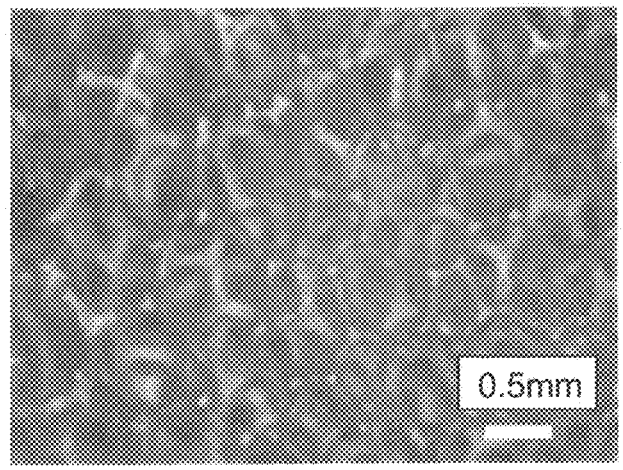
FIG. 10 is an enlarged view of a surface of a humidification element (base material) made of foam metal.

FIG. 10 is an enlarged view of a surface of the sheet member (base material) on which the hydrophilic coating film 7 is formed, the sheet member being made of foam metal. The foam metal, in which the metal has a three-dimensional network structure, forming gaps, can hold water. Note that the length of the blank space below the numeric value 0.5 mm in FIG. 10 corresponds to a length of "0.5 mm."

Embodiment 3

Figure 11:
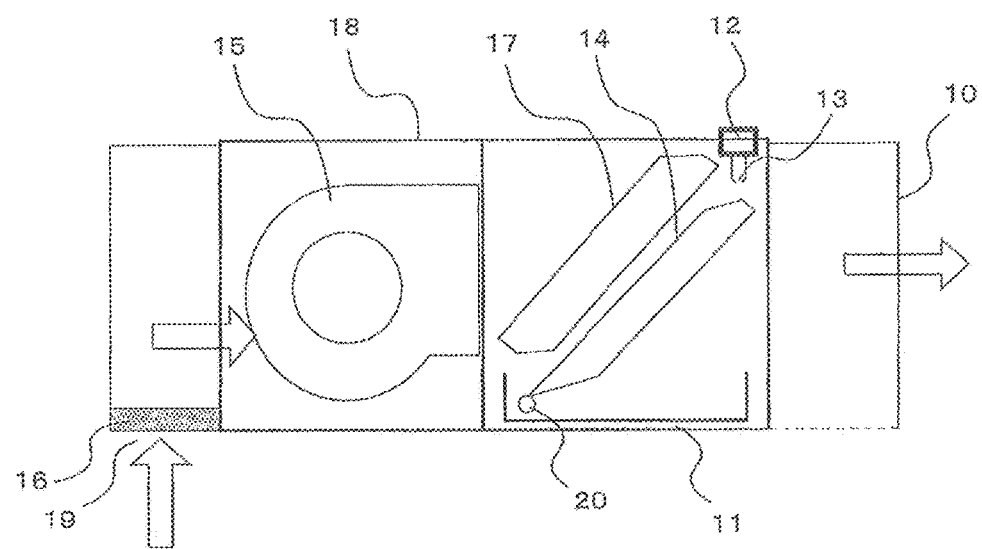
FIG. 11 is a sectional block diagram of a humidification device according to Embodiment 3.

FIG. 11 is a sectional block diagram of a humidification device according to Embodiment 3. Embodiment 3 uses the humidification element 14 according to Embodiment 2.

A housing 18 includes an air inlet 19 and an air outlet 10. A filter 16 is provided on an inner side of the air inlet 19. A fan 15, a heat exchanger 17, the humidification element 14, and a drain pan 11 are installed in the housing 18. Air is fed into the housing 18 by the fan 15 through the air inlet 19 and filter 16. The fed air is passed through the heat exchanger 17 and humidification element 14 and discharged through the air outlet 10. In so doing, in the humidification element 14, water is dropped from a water supply unit 12 equipped with a nozzle 13, creating a hydrated state and humidifying the fed air. Also, the dropped water is discharged to the drain pan 11 as water droplets 20 through the humidification element 14.

EXAMPLES

Details of the present invention will be described below with reference to examples and comparative examples, which, however are not intended to limit the present invention. Humidification elements (specimens) using hydrophilic coating films 7 created in the examples and comparative examples were measured and evaluated by methods described below.

(Evaluation of Specific Surface Areas of Coating Films)

The specific surface area of each coating film was evaluated using the following formula from a value of the specific surface area of the coated specimen and a weight change before and after formation of the coating film, where the value of the specific surface area was calculated by a gas adsorption method (BET method).

Specific surface area ($m^2/g$) of the coating film={(specific surface area ($m^2/g$) of the specimen after coating)×(weight (g) of the specimen after coating)}÷{(weight (g) of the specimen after coating)−(weight (g) of the specimen before coating)}

(Evaluation of Water Absorbency)

Regarding water absorption, a 3-cm lower end portion of a specimen measuring 3 cm×15 cm×1 mm was put in contact with water and allowed to absorb water for predetermined periods of time (for ten seconds, 30 seconds, 60 seconds, and 600 seconds), and then suction height was measured.

(Evaluation of Water Absorption Speed)

Regarding water absorption speed, a 50-μL water droplet was dropped from a height of 1 cm onto a specimen measuring 3 cm×3 cm×1 mm and the time required for the droplet to be absorbed by the specimen was measured.

(Evaluation of Humidification Performance)

Humidification performance was evaluated as follows: the humidity on an inlet side and outlet side of base material installed in an air duct with a constant wind velocity (temperature=20 degrees C.; humidity=55% RH; wind velocity=2.0 m/s; air quantity=132 $m^3/h$) was measured with a dew point recorder and an amount of humidification was calculated from values of the absolute humidity using the following formula.

Humidification performance (cc/h/$m^2$)=(outlet-side absolute humidity (g/kg)−inlet-side absolute humidity (g/kg))×air quantity ($m^3/h$)/humidification area ($m^2$)

(Evaluation of VOC Resistance)

Regarding VOC resistance, the humidification element 14 was exposed to vapor of an ethanol solution containing 50 mass % of α-pinene, which is a hydrophobic compound, for a predetermined period of time, then the humidification performance was evaluated, and the VOC resistance was evaluated in the following three steps based on changes from initial humidification performance. In this evaluation, by assuming that a humidification time per season was 2000 hours and that VOCs in the atmosphere were supplied continuously at 400 μg/$m^3$ of a target value for indoor air, performance was evaluated after lapses of time equivalent to five years and ten years.

⊚ : Rate of change with respect to the initial humidification performance was 5% or less.

○: Rate of change of humidification performance with respect to the initial humidification performance was between 5% and 10%.

×: Rate of change of humidification performance with respect to the initial humidification performance was above 10%.

(Evaluation of Water Resistance)

The Humidification element 14 was exposed to running water (2 L/minute) for predetermined periods of time (24 hours, 240 hours, 720 hours, and 1440 hours) and water resistance was evaluated in the following three steps based on changes from initial humidification performance.

⊚ : Rate of change of humidification performance with respect to the initial humidification performance was 5% or less.

○: Rate of change of humidification performance with respect to the initial humidification performance was between 5% and 10%.

×: Rate of change of humidification performance with respect to the initial humidification performance was above 10%.

Example 1

A coating composition was prepared as follows: 0.05 mass % of sodium polyacrylate (RHEOGIC 262L produced by TOAGOSEI CO., LTD.) was dissolved as a thickener in deionized water, and then colloidal silica containing silica particulates with an average particle diameter of 10 to 15 nm (SNOWTEX O produced by Nissan Chemical Industries, Ltd.) was added as hydrophilic fine inorganic particles and silica sol with an average particle diameter of 0.67 μm (LA-S23A, with a pore diameter of 16 nm, produced by Nissan Chemical Industries, Ltd.) was added as silica gel particles, followed by stirring and mixing. In the coating composition, the content of hydrophilic inorganic fine particles was 2 mass % and the content of silica gel particles was 0.1 mass %.

Next, nonwoven fabric (Univeks, with an average hole diameter of 63 μm and a thickness of 1 mm, produced by Unitika Ltd.) was dip coated as a porous material with the coating composition and dried under natural conditions, forming a hydrophilic coating film to obtain a humidification element. When measured by the method described above, the specific surface area of the formed hydrophilic coating film was 350 $m^2/g$.

Example 2

A coating composition was prepared as follows: 0.05 mass % of sodium polyacrylate (RHEOGIC 262L produced by TOAGOSEI CO., LTD.) was dissolved as a thickener in deionized water, and then colloidal silica containing silica particulates with an average particle diameter of 10 to 15 nm (SNOWTEX 0 produced by Nissan Chemical Industries, Ltd.) was added as hydrophilic fine inorganic particles and silica sol with an average particle diameter of 0.29 μm (LA-S263, with a pore diameter of 16 nm, produced by Nissan Chemical Industries, Ltd.) was added as silica gel particles, followed by stirring and mixing. In the coating composition, the content of hydrophilic inorganic fine particles was 2 mass % and the content of silica gel particles was 0.1 mass %.

Next, nonwoven fabric (Univeks, with an average hole diameter of 63 μm and a thickness of 1 mm, produced by Unitika Ltd.) was dip coated as a porous material with the coating composition and dried under natural conditions, forming a hydrophilic coating film to obtain a humidification element. When measured by the method described above, the specific surface area of the formed hydrophilic coating film was 400 m$^2$/g.

Example 3

A coating composition was prepared as follows: 0.05 mass % of sodium polyacrylate (RHEOGIC 262L produced by TOAGOSEI CO., LTD.) was dissolved as a thickener in deionized water, and then colloidal silica containing silica particulates with an average particle diameter of 10 to 15 nm (SNOWTEX O produced by Nissan Chemical Industries, Ltd.) was added as hydrophilic fine inorganic particles and silica sol with an average particle diameter of 0.29 μm (LA-S263, with a pore diameter of 16 nm, produced by Nissan Chemical Industries, Ltd.) was added as silica gel particles, followed by stirring and mixing. In the coating composition, the content of hydrophilic inorganic fine particles was 2 mass % and the content of silica gel particles was 0.2 mass %.

Next, nonwoven fabric (Univeks, with an average hole diameter of 63 μm and a thickness of 1 mm, produced by Unitika Ltd.) was dip coated as a porous material with the coating composition and dried under natural conditions, forming a hydrophilic coating film to obtain a humidification element. When measured by the method described above, the specific surface area of the formed hydrophilic coating film was 450 m$^2$/g.

Example 4

A coating composition was prepared as follows: 0.05 mass % of sodium polyacrylate (RHEOGIC 262L produced by TOAGOSEI CO., LTD.) was dissolved as a thickener in deionized water, and then colloidal silica containing silica particulates with an average particle diameter of 4 to 6 nm (SNOWTEX OXS produced by Nissan Chemical Industries, Ltd.) was added as hydrophilic fine inorganic particles and silica sol with an average particle diameter of 0.29 μm (LA-S263, with a pore diameter of 16 nm, produced by Nissan Chemical Industries, Ltd.) was added as silica gel particles, followed by stirring and mixing. In the coating composition, the content of hydrophilic inorganic fine particles was 2 mass % and the content of silica gel particles was 0.2 mass %.

Next, nonwoven fabric (Univeks, with an average hole diameter of 63 μm and a thickness of 1 mm, produced by Unitika Ltd.) was dip coated as a porous material with the coating composition and dried under natural conditions, forming a hydrophilic coating film to obtain a humidification element. When measured by the method described above, the specific surface area of the formed hydrophilic coating film was 600 m$^2$/g.

Example 5

A coating composition was prepared as follows: 0.05 mass % of sodium polyacrylate (RHEOGIC 262L produced by TOAGOSEI CO LTD.) was dissolved as a thickener in deionized water, and then colloidal silica containing silica particulates with an average particle diameter of 40 to 100 nm (SNOWTEX UP produced by Nissan Chemical Industries, Ltd.) was added as hydrophilic fine inorganic particles and silica sol with an average particle diameter of 0.29 μm (LA-S263, with a pore diameter of 16 nm, produced by Nissan Chemical Industries, Ltd.) was added as silica gel particles, followed by stirring and mixing. In the coating composition, the content of hydrophilic inorganic fine particles was 2 mass % and the content of silica gel particles was 0.2 mass %.

Next, nonwoven fabric (Univeks, with an average hole diameter of 63 μm and a thickness of 1 mm, produced by Unitika Ltd.) was dip coated as a porous material with the coating composition and dried under natural conditions, forming a hydrophilic coating film to obtain a humidification element. When measured by the method described above, the specific surface area of the formed hydrophilic coating film was 200 m$^2$/g.

Comparative Example 1

Nonwoven fabric (Univeks, with an average hole diameter of 63 μm and a thickness of 1 mm, produced by Unitika Ltd.) was used as a humidification element. The specific surface area of the nonwoven fabric was 0.5 m$^2$/g.

Comparative Example 2

A coating composition was prepared as follows: colloidal silica containing silica particulates with an average particle diameter of 12 nm (SNOWTEX O produced by Nissan Chemical Industries, Ltd.) was added as hydrophilic fine inorganic particles to deionized water, followed by stirring and mixing. In the coating composition, the content of hydrophilic inorganic fine particles was 2 mass %.

Next, nonwoven fabric (Univeks, with an average hole diameter of 63 μm and a thickness of 1 mm, produced by Unitika Ltd.) was dip coated as a porous material with the coating composition and dried under natural conditions, forming a hydrophilic coating film to obtain a humidification element. When measured by the method described above, the specific surface area of the formed hydrophilic coating film was 100 m$^2$/g.

Comparative Example 3

A coating composition was prepared as follows: 0.05 mass % of sodium polyacrylate (RHEOGIC 262L produced by TOAGOSEI CO., LTD.) was dissolved as a thickener in deionized water, and then colloidal silica containing silica particulates with an average particle diameter of 20 to 25 nm (SNOWTEX ST-O-40 produced by Nissan Chemical Industries, Ltd.) was added as hydrophilic fine inorganic particles and silica sol with an average particle diameter of 0.29 μm (LA-S263, with a pore diameter of 16 nm, produced by Nissan Chemical Industries, Ltd.) was added as silica gel particles, followed by stirring and mixing. In the coating composition, the content of hydrophilic inorganic fine particles was 2 mass % and the content of silica gel particles was 0.1 mass %.

Next, nonwoven fabric (Univeks, with an average hole diameter of 63 μm and a thickness of 1 mm, produced by Unitika Ltd.) was dip coated as a porous material with the coating composition and dried under natural conditions, forming a hydrophilic coating film to obtain a humidification element. When measured by the method described above, the specific surface area of the formed hydrophilic coating film was 60 m²/g.

The humidification elements produced in the above examples and comparative examples were evaluated in the manner described above. Results thereof are shown in Table 1.

TABLE 1

|  |  | Ex. 1 | Ex. 2 | Ex. 3 | Ex. 4 | Ex. 5 | Cpr. 1 | Cpr. 2 | Cpr. 3 |
|---|---|---|---|---|---|---|---|---|---|
| SSA (m²/g) |  | 350 | 400 | 450 | 600 | 200 | — | 100 | 60 |
| WA (mm) | 10 Sec | 60 | 55 | 55 | 55 | 55 | 40 | 50 | 40 |
|  | 30 Sec | 65 | 72 | 80 | 90 | 60 | 80 | 85 | 80 |
|  | 60 Sec | 103 | 110 | 115 | 108 | 85 | 90 | 90 | 80 |
|  | 100 Sec | 103 | 110 | 115 | 108 | 85 | 90 | 90 | 80 |
| WAS (Sec.) |  | 1< | 1< | 1< | 1< | 1< | 1< | 1< | 1< |
| HP (g/h/m²) |  | 1100 | 1150 | 1250 | 1300 | 950 | 750 | 890 | 800 |
| VOCR | ET 5 years | Good | Good | Good | Good | Good | Good | Good | Poor |
|  | ET 10 years | Tolerable | Good | Good | Good | Tolerable | Tolerable | Tolerable | Poor |
| WR | 24 hrs. | Good | Good | Good | Good | Good | Good | Good | Tolerable |
|  | 240 hrs. | Good | Good | Good | Good | Tolerable | Tolerable | Tolerable | Poor |
|  | 720 hrs. | Tolerable | Good | Good | Good | Tolerable | Tolerable | Tolerable | Poor |
|  | 1440 hrs. | Tolerable | Tolerable | Good | Good | Tolerable | Tolerable | Poor | Poor |

Ex: Example
Cpr: Comparative Example
SS: SPECIFIC SURFACE AREA
WA: WATER ABSORBENCY
WAS: WATER ABSORPTION SPEED
HP: HUMIDIFICATION PERFORMANCE
VOCR: VOC RESISTANCE
ET: "EQUIVALENT TO"
WR: WATER RESISTANCE
hrs.: HOURS As shown in Table 1, the humidification elements in Examples 1 to 5 using the hydrophilic coating film produced by the production method according to the present embodiment exceled not only in initial humidification performance, but also in long-term humidification performance.

In contrast, the humidification element in Comparative Example 1, in which only nonwoven fabric was used, had low water absorbency and insufficient initial humidification performance. Also, the humidification element in Comparative Example 2, in which silica gel particles were not admixed, had a small specific surface area and inferior long-term humidification performance. Also, the humidification element in Comparative Example 3, in which silica particulates whose average particle diameter was larger than the average diameter of the pores in silica gel particles, had a small specific surface area, low water absorbency, and insufficient initial and subsequent humidification performance.

As can be seen from the above results, the present invention provides a hydrophilic coating film that excels not only in initial humidification performance, but also in long-term humidification performance as well as provides a production method for the hydrophilic coating film and a humidification element.

The invention claimed is:
1. A hydrophilic coating film, comprising:
porous silica gel particles;
hydrophilic silica fine particulates having an average particle diameter smaller than an average pore diameter of the silica gel particles; and
a thickener.

2. The hydrophilic coating film of claim 1, wherein the average particle diameter of the hydrophilic silica fine particulates is equal to or greater than 4 nm and equal to or less than 15 nm.

3. The hydrophilic coating film of claim 1, wherein an average pore diameter of the silica gel particles is greater than 4 nm and equal to or less than 100 nm.

4. The hydrophilic coating film of claim 1, wherein a content of the silica gel particles is equal to or greater than 1 mass % and less than 10 mass % of the hydrophilic silica fine particulates.

5. The hydrophilic coating film of claim 1, wherein a specific surface area of the hydrophilic coating film is equal to or greater than 200 m²/g and equal to or less than 600 m²/g.

6. The hydrophilic coating film of claim 1, further comprising hydrophilic silica fine particulates with an average particle diameter of greater than 15 nm and equal to or less than 100 nm.

7. A humidification element, wherein the hydrophilic coating film of claim 1 is formed on a surface of the humidification element.

8. A humidification device comprising:
the humidification element of claim 7;
a water supply unit adapted to supply water to the humidification element; and
a fan adapted to send air to the humidification element.

9. A method for producing a hydrophilic coating film, the method comprising:
coating a base material with a coating composition and drying the coated base material,
the coating composition comprising water, a thickener, porous silica gel particles, and hydrophilic silica fine particulates having an average particle diameter smaller than an average pore diameter of the silica gel particles.

10. The method of claim 9, wherein an average particle diameter of the hydrophilic silica fine particulates is equal to or greater than 4 nm and equal to or less than 15 nm.

11. The method of claim 9, wherein an average pore diameter of the silica gel particles is greater than 4 nm and equal to or less than 100 nm.

12. The method of claim 9, wherein the hydrophilic coating film further comprises hydrophilic silica fine particulates with an average particle diameter of greater than 15 nm to equal to or less than 100 nm.

13. The method of claim 9, wherein a content of the hydrophilic silica fine particulates in the coating composition is equal to or greater than 0.2 mass % and equal to or less than 10.0 mass %.

14. The method of claim 9, wherein a content of the thickener in the coating composition is equal to or greater than 0.05 mass % and equal to or less than 0.25 mass %.

* * * * *